(12) United States Patent
Jäkel et al.

(10) Patent No.: US 8,018,927 B2
(45) Date of Patent: Sep. 13, 2011

(54) NETWORK ELEMENT WITH MULTISTAGE LOWER ORDER SWITCHING MATRIX

(75) Inventors: Hans-Jörg Jäkel, Stuttgart (DE); Hartmut Borschel, Stuttgart (DE); Werner Beisel, Ludwigsburg (DE); Pierre Amedee Humblet, Cambridge, MA (US); Brian William Schoenherr, Andover, MA (US)

(73) Assignee: Alcatel Lucent, Paris (FR)

( * ) Notice: Subject to any disclaimer, the term of this patent is extended or adjusted under 35 U.S.C. 154(b) by 1601 days.

(21) Appl. No.: 11/081,514

(22) Filed: Mar. 17, 2005

(65) Prior Publication Data

US 2005/0254527 A1 Nov. 17, 2005

(30) Foreign Application Priority Data

May 14, 2004 (EP) .................................. 04291234

(51) Int. Cl.
*H04Q 11/00* (2006.01)
*H04L 12/56* (2006.01)
(52) U.S. Cl. ........................... 370/386; 370/389; 385/17
(58) Field of Classification Search ........................ None
See application file for complete search history.

(56) References Cited

U.S. PATENT DOCUMENTS

| | | | | |
|---|---|---|---|---|
| 5,042,062 A * | 8/1991 | Lee et al. | .................... | 348/14.11 |
| 5,267,239 A * | 11/1993 | Pospischil et al. | ............ | 370/539 |
| 5,436,890 A * | 7/1995 | Read et al. | .................... | 370/352 |
| 5,555,243 A * | 9/1996 | Kakuma et al. | ............... | 370/352 |
| 5,757,793 A * | 5/1998 | Read et al. | .................... | 370/358 |
| 5,850,387 A * | 12/1998 | Lyon et al. | .................... | 370/250 |
| 6,188,686 B1 * | 2/2001 | Smith | ............................ | 370/388 |
| 6,335,992 B1 * | 1/2002 | Bala et al. | ........................ | 385/17 |
| 6,343,075 B1 | 1/2002 | Klausmeier | | |
| 6,653,929 B1 * | 11/2003 | Hu et al. | ......................... | 340/2.1 |
| 6,795,432 B1 * | 9/2004 | Lee | ................................. | 370/388 |
| 6,834,049 B1 * | 12/2004 | Tomar et al. | ................... | 370/369 |
| 7,342,922 B1 * | 3/2008 | Vanesko | ......................... | 370/380 |
| 7,353,288 B1 * | 4/2008 | Rangavajjhala et al. | ...... | 709/236 |
| 7,596,135 B1 * | 9/2009 | Iovine et al. | ................... | 370/388 |
| 2001/0053146 A1 * | 12/2001 | Lyon et al. | .................... | 370/359 |
| 2001/0055135 A1 * | 12/2001 | Sigloch | ......................... | 359/124 |
| 2002/0075908 A1 * | 6/2002 | Lee et al. | ....................... | 370/539 |
| 2003/0016416 A1 * | 1/2003 | Wolf | .............................. | 359/139 |
| 2005/0135385 A1 * | 6/2005 | Jenkins et al. | ................ | 370/401 |
| 2005/0220148 A1 * | 10/2005 | DelRegno et al. | ............ | 370/498 |
| 2006/0209816 A1 * | 9/2006 | Li et al. | ......................... | 370/386 |

OTHER PUBLICATIONS

"Types and General Characteristics of Synchronous Digital Hierarchy (SDH) Equipment", ITU-T G.782, 'Online! Jan. 1994, pp. 21-24, XP002300535.

* cited by examiner

*Primary Examiner* — Ricky Ngo
*Assistant Examiner* — Clemence Han
(74) *Attorney, Agent, or Firm* — Sughrue Mion, PLLC

(57) ABSTRACT

A network element for a transport network contains a multistage lower order switching matrix with at least an input matrix stage and an output matrix stage designed to switch lower order multiplex units and with a center stage capable of switching higher order multiplex units, only, thereby connecting the input and output stages.

20 Claims, 4 Drawing Sheets

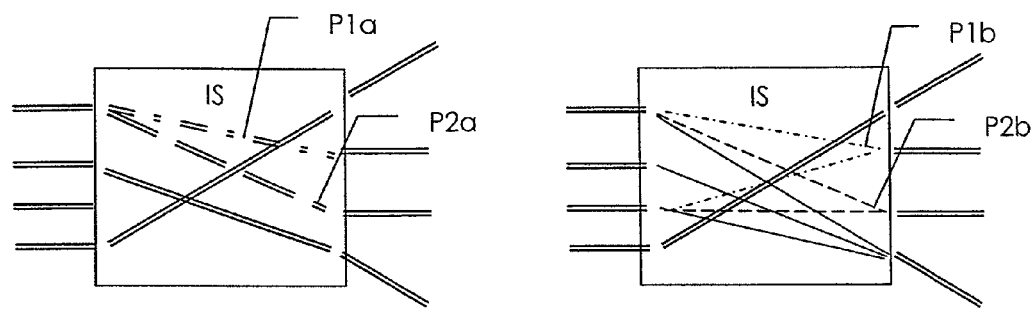
*Fig. 7a* RELATED ART  *Fig. 7b*

NETWORK ELEMENT WITH MULTISTAGE LOWER ORDER SWITCHING MATRIX

The invention is based on a priority application EP 04291234.5 which is hereby incorporated by reference.

FIELD OF THE INVENTION

The present invention relates to the field of telecommunications and more particularly to a network element of a transport network with a multistage lower order switching matrix.

BACKGROUND OF THE INVENTION

Transport networks serve for the physical layer transport of tributary signals. Such tributaries are multiplexed together according to multiplexing rules to form higher bitrate multiplex signals for a more efficient transport through the network. A well known type of transmission networks conforms with the SDH standard ITU-T G.707, 10/2000, which is incorporated by reference herein. The US equivalent of SDH is referred to as SONET.

In SDH, tributary signals are mapped into virtual containers of appropriate size. Lower order virtual containers are multiplexed into higher order virtual containers. The higher order virtual containers are mapped into frames where they are addressed by a higher order pointer called the administrative unit (AU) pointer, which allows them to float freely inside the frames so as to balance phase and frequency deviations in the network. Similarly, the lower order virtual containers are addressed inside the higher order virtual containers by lower order pointers called the tributary unit (TU) pointers.

The basic frame structure is called STM-1 (synchronous transport module). Higher capacity signals are obtained by bytewise multiplexing N STM-1 signals to form an STM-N signal.

Virtual connections, which are referred to as paths, are established within the network through the use of network elements that are capable of switching these virtual containers from any to any I/O port in space and time domain. This process is typically referred to as crossconnecting because such virtual connections are of semi-permanent nature. Such network elements are therefore also termed crossconnects.

For an SDH network, there exist basically two types of crossconnects, namely broadband crossconnects that are capable of switching higher order virtual containers, only, and wideband crossconnects that are capable of switching both, higher order and lower order virtual containers.

The core of a crossconnect is its switching matrix. Depending on the required matrix capacity, some crossconnects use a square switching matrix, while others have a multi-stage switching matrix such as a Clos matrix. Wideband crossconnects have often a higher order switching matrix and a separate lower order switching matrix. A generalized logical block diagram of such an architecture is shown for example in ITU-T G.782 01/94, FIG. 3-9.

In the existing networks, a need for more and more switching capacity arises as the traffic volume increases, particularly in metropolitan area networks. On the other hand, network operators request more compact and cost-effective network elements that require less footprint space while providing at the same time lower power consumption and reduced heat dissipation. It is therefore an object of the present invention to provide a compact high capacity wideband crossconnect.

SUMMARY OF THE INVENTION

These and other objects that appear below are achieved by a network element for a transport network of the type discussed before, which contains a multistage lower order switching matrix with at least an input and an output matrix stage designed to switch lower order multiplex units and with a center stage capable of switching higher order multiplex units, only, thereby connecting the input and output stages.

The matrix design according to the invention is very advantageous as the same center stage matrix components can be re-used for the lower order switching matrix that have to be developed for a higher order switching matrix, anyway. This reduces the development time and costs dramatically. Preferably, the input and output stages are arranged on the I/O boards of the crossconnect. This leads to very compact design and has the additional advantage that a broadband crossconnect can be altered into a wideband crossconnect by simply replacing the I/O boards.

In another aspect of the invention, the network element has a three stage lower order switch matrix, which contains
  an input matrix stage and an output matrix stage, wherein both include a plurality of hybrid matrices designed to switch said lower order multiplex units or higher order multiplex units; and
  a center stage comprising of a plurality of matrices capable of switching higher order multiplex units only, wherein each of the plurality of center stage matrices is connected to each of the first input matrix stage matrices and each of the output matrix stage matrices.

BRIEF DESCRIPTION OF THE DRAWINGS

Preferred embodiments of the invention will be describe in the following with reference to the accompanying drawings, in which

FIGS. 7a and 7b show rearrangement of broadband and wideband connections in an end stage module.

DETAILED DESCRIPTION OF THE INVENTION

Figure 1:
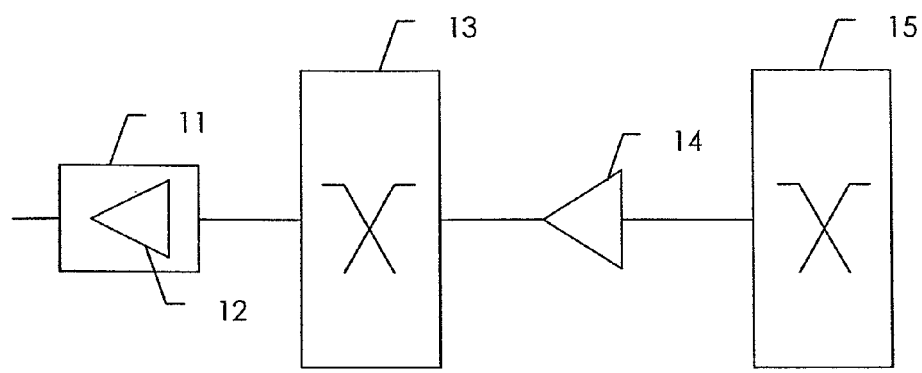
FIG. 1 shows a genera lized logical block diagram of a wideband crossconnect.

The basic design of a wideband crossconnect such as it was known from ITU-T G.782 (01/94) is shown as a block diagram in FIG. 1. It contains an input/output port 11 with a line termination function 12 connected to a higher order crossconnect matrix 13. Crossconnect matrix 13 is connected via a higher order assembler function 14 to a lower order crossconnect matrix 15. For the sake of simplicity, only one I/O port and only one matrix connection is shown, although it should be clear to those skilled in the art that each matrix has a number matrix connections and that a number of I/O ports are available in a crossconnect.

The function of this architecture is as follows. An STM-N signal is received at the I/O port 11, where the section overhead is terminated by line termination function 12. This function is also referred to as the transport terminal function (TTF). Higher order multiplexing units of the type AU-4 or AU-3 are crossconnected by the higher order matrix 13 from any to any I/O port. This function is known as higher order path connection (HPC). When lower order access is required, i.e., when traffic at lower order virtual container level VC-3 (for SDH only) VC-2, VC-12, or VC-11 is to be crossconnected between any two I/O ports, then these signals are switched to the corresponding matrix connections via higher order assembler functions 14 to the lower order matrix 15, where lower order path connections (LPC) are established. The higher order assembler contains a higher order path termination (HPT) function and a higher order path adaptation (HPA) function. An example of a HPA function is described in EP 0 440 128 B, which is incorporated by reference herein.

The invention provides a scalable implementation of functional blocks 14 and 15 which allows very high traffic volume at low costs and with high density. This is achieved through the use of a three stage matrix where only input and output stages perform lower order switching while the center stage of the matrix switches higher order multiplex units, only, i.e., VC-4 or VC-3 or both of these.

The use of a center stage switching only high order connections considerably reduces its complexity and cost. It causes, however, some loss of capacity because some high order connections to and from the center stage may not be filled with low order connections. One can show that the number of wasted high order connections to (or from) an end stage need not exceed the number of end stages. The invention proposes thus a design where the number of end stages is small compared to the number of higher order connections out of an end stage and where the loss due to incomplete packed internal connections is therefore negligible.

Figure 2:
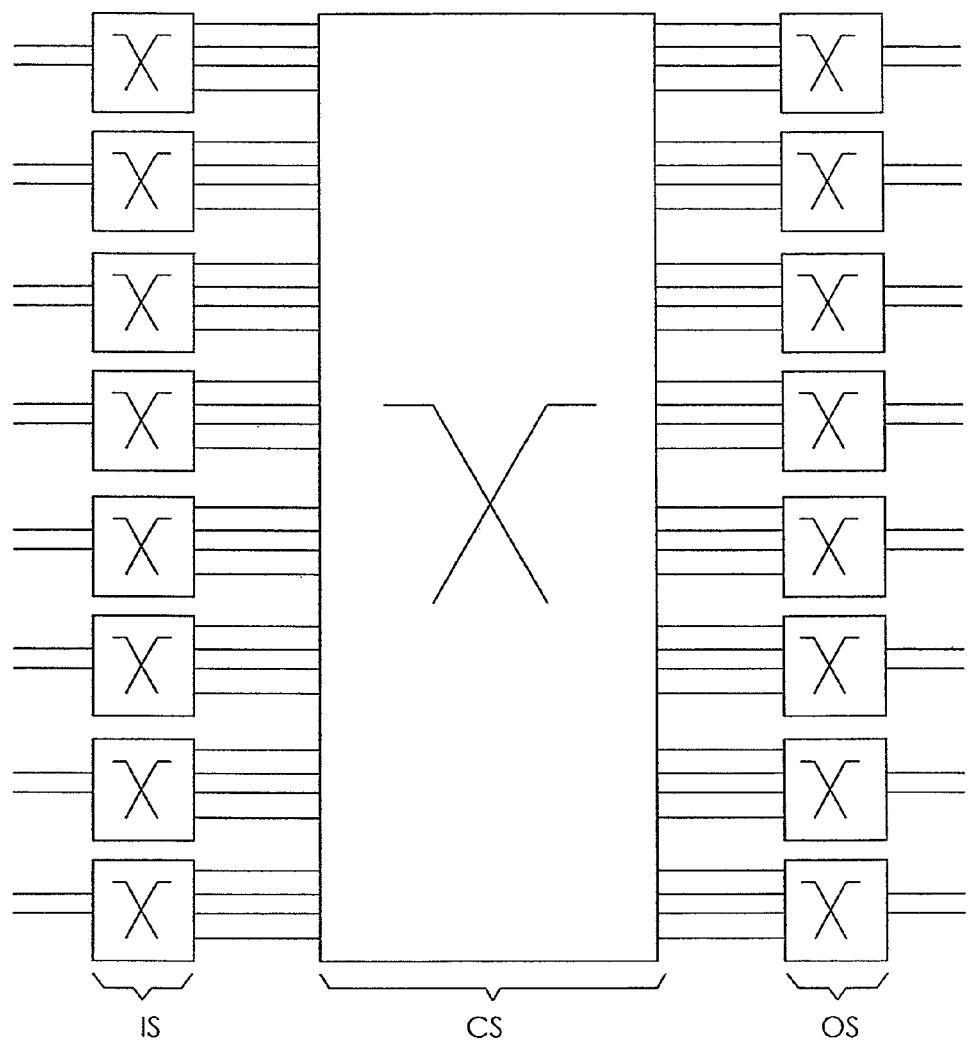
FIG. 2 shows the architecture of a lower order crossconnect matrix according to the invention.

The principle of the invention is shown in FIG. 2. The crossconnect matrix has as its center stage CS a square matrix capable of switching at the level of higher order multiplexing units, only, preferably at level VC-3. The center stage has in the preferred embodiment an overall capacity of 640 Gbit/s, i.e. of 4096 STM-1 equivalents. The input stage IS and the output stage OS each consists in this embodiment of 8 lower order switch modules. Each lower order switch module of the input stage has two inputs and four outputs for STM-64 signals. Conversely, each module of the output stage has four inputs connected to the center stage and two outputs for STM-64 signals. Each module of the input and the output stage has thus a capacity of 20 Gbit/s or in other words of 128 STM-1 equivalents. This is due to the fact that a 1:2 broadening in the end stages is required to fully support sub-network connection protection (SNCP) function in a non-blocking manner. However, if no SNCP support is required or if blocking can be tolerated under certain conditions, then each end stage module can have as many inputs as outputs.

While the internal connections between input stage, center stage and output stage are shown in FIG. 2 as 10 Gbit/s connections (i.e., internal STM64), it is preferred to demultiplex the internal signals down to 2.5 Gbit/s (i.e., internal STM16), which can be easily implemented as a back panel bus.

Figure 3:
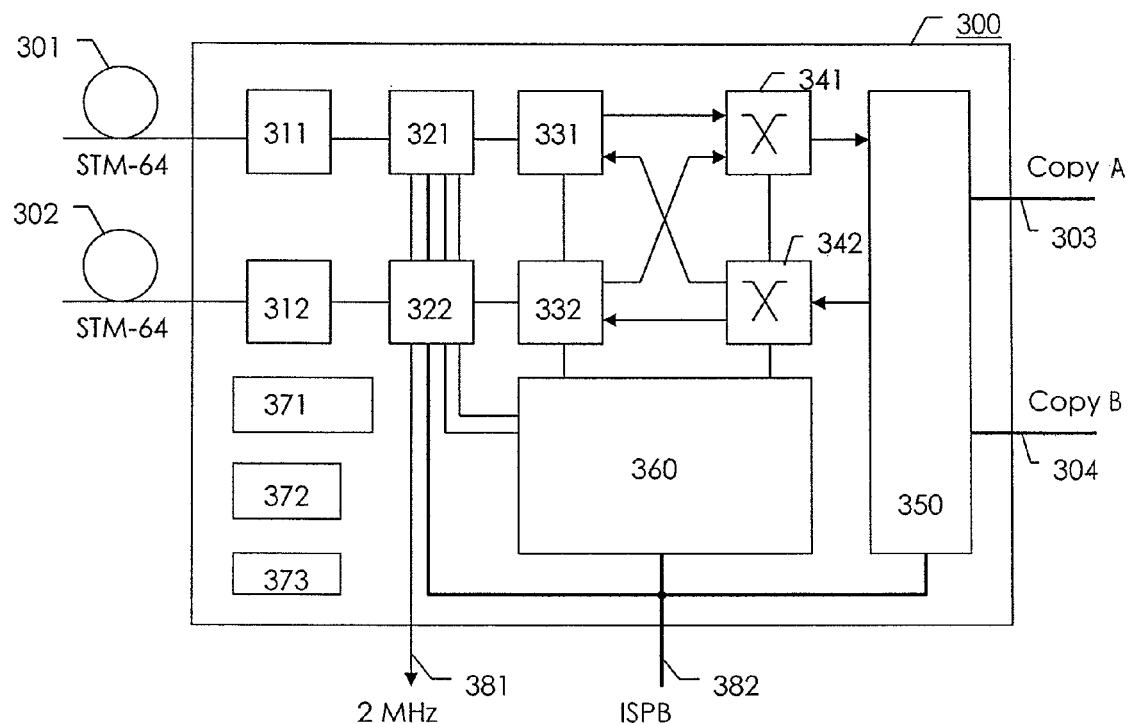
FIG. 3 shows the hardware architecture of an I/O board with lower order matrix stages for use in a wideband crossconnect according to the invention.

Input stage modules and output stage modules are physically arranged on the same I/O boards. An exemplary I/O board 300 is shown in FIG. 3. It contains terminals for two optical fibers 301 and 302, each carrying an STM64 signal. Fiber 301 is connected to an optical-to-electrical converter 311, which converts the received optical signal to an electrical signal that is fed to an overhead processing circuit 321. Overhead processing circuit demultiplexes the 10 GBit/s STM64 signal into four STM16 signals, extracts and processes the section overhead and derives a 2 MHz reference clock signal 381. Overhead processing circuit 321 is connected to a TU pointer processor 331, which performs higher order path termination and adaptation on the individual VC-4 or VC-3 signals contained with the STM16. Fiber 302 is in turn connected to optical-to-electrical converter 312, which feeds via overhead processing circuit 322 to TU pointer processor 332. TU pointer processors 331 and 332 are connected to the inputs of a lower order switch module 341 which forms part of the input stage of the 3-stage matrix arrangement shown in FIG. 2. The outputs of matrix module 341 are connected to a back panel interface 350, which connects to the back panel of the crossconnect and provides an equipment protection switching (EPS) function between the center stage copies A and B.

As shown in FIG. 3, a direct connection exists between the 1st stage 341 and 3rd stage 342 on the same card. It could be used to route low order connections that remain on the same card, and this would reduce the load on the center stage and the potential attendant blocking probability. This feature is not necessarily used in an implementation of the invention for ETSI SDH but it might be advantageously used in an ANSI (i.e., SONET) implementation.

In addition, the I/O board 300 has an on board processor 360, which can easily be realized as an FPGA (Field Programmable Gate Array). Processor 360 receives the extracted overhead bytes from overhead processors 321 and 322, performs pre-processing of performance monitoring (PM) data and alarm filtering and sends the raw PM data to the back panel interface 350 for in-band signaling. Moreover, processor 360 configures the TU pointer processors 331 and 332 to the actual multiplex structures within the received STM64 signals, respectively. Finally, the I/O board contains some support functions such as a circuit 371 for management access, i.e., for FPGA download and for controlling the optical-to electrical converters 311 and 312, an onboard power supply 372, and an voltage controlled oscillator 373 for generating local clocks. A control lead 382 connects to a common shelf controller.

In transmit direction, internal signals from center stage matrix CS are received from the back panel at back panel interface 350, which extracts in-band channel information and forwards the internal STM16 signals to the inputs of a lower order switch module 342 which forms part of the output stage of the Clos Matrix of FIG. 2. The outputs of switch module 342 are fed via TU pointer processors 331 and 332 to overhead processors 321 and 322, respectively, where the signals are multiplexed to form output STM64 signals and section overhead bytes as received from processor 360 inserted. The STM64 signals are then converted to the optical by converters 311 and 312 and send to fibers 301 and 302, respectively.

Figure 4:
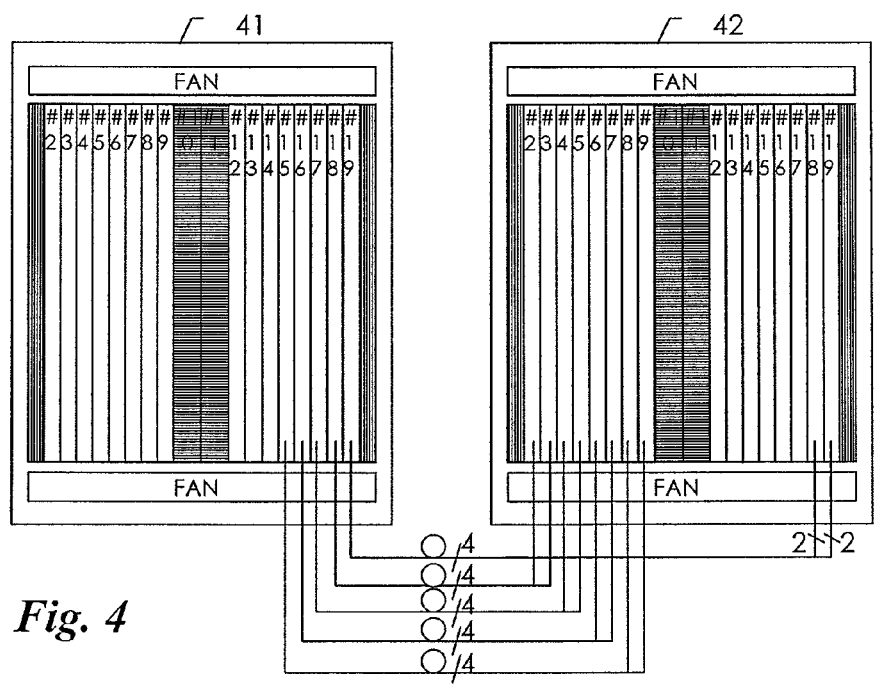
FIG. 4 shows the physical setup of a wideband crossconnect making use of the invention.

FIG. 4 shows a front side view of an assembled wideband crossconnect system, which consists of a broadband crossconnect 41 and a lower order extension shelf 42. The system makes use of a conventional broadband crossconnect 41 system such as the Alcatel 1678 Metro Core Connect. In the figure, broadband crossconnect 41 contains a shelf with a back panel, fans on top and bottom and 20 slots for circuit boards. Slots #1 and #20 are not visible from the front plate as they hold bus termination boards for the high speed back panel bus. Slots #2 to #9 and #12 to #19 hold I/O boards and slots #10 and #11 hold matrix boards acting as matrix copy A and B, respectively. Each matrix board contains a higher order square matrix providing a total capacity of 4096 STM-1 equivalents. Each I/O board terminates 4 external optical fibers carrying STM64 signals.

Each I/O board has four I/O ports for STM64 signals. The back panel interconnects I/O boards and matrix boards at 2.5 Gbits/s. STM64 signals received at the I/O ports of the I/O boards are thus demultiplexed into four internal STM16 signals, respectively. Each matrix board is capable of switching AU-3 contained within the internal STM16 signals. This enable full support for SONET type signals. For ETSI type signals, the matrix switches AU-4 as three contiguous concatenated AU-3s in parallel, thus allowing also full support for ETSI type signals.

Most of the hardware of the broadband crossconnect 41 is also re-used for the lower order extension shelf 42, where only the I/O cards are replaced with I/O cards from FIG. 3. The only change that must be made to the matrix boards in slots #10 and #11 affects the firmware (FPGA code) on the boards so as to enable processing and storage of lower order PM data instead of higher order PM data. PM data processing is, however, well known per se to those skilled in the art.

As described above, each I/O board of the broadband crossconnect has four STM64 ports, while each I/O board of the extension shelf has only two STM64 ports. I/O boards in slots #15 to #18 of the broadband system 41 are used for internal interconnections between the broadband system and the extension shelf. The I/O board in slot #19 is used as protection board to replace any other failed board in the case of a failure. In the extension shelf 42, the I/O boards in slots #2 to #9 are used for lower order path access, while the boards in slots #18 and #19 serve for equipment protection purpose. Slots #12 to #17 of the extension system 41 could be left unused or could be used in the same way together with slots #12 to #14 of the broadband system 41. The I/O ports of each I/O board from system 41 that is used for internal interconnections is connected via four fibers to the two I/O ports of two I/O boards from extension shelf 42. For instance, the board in slot #15 of shelf 41 connects to the boards #2 and #3 in shelf 41. Equally, the protection board in slot #19 of shelf 41 connects to the two protection boards in slots #18 and #19 of shelf 42. From the lower order extension shelf 42, the internal signals looped back to the higher order system 41, where they are switched to the appropriate output ports.

Figure 5:
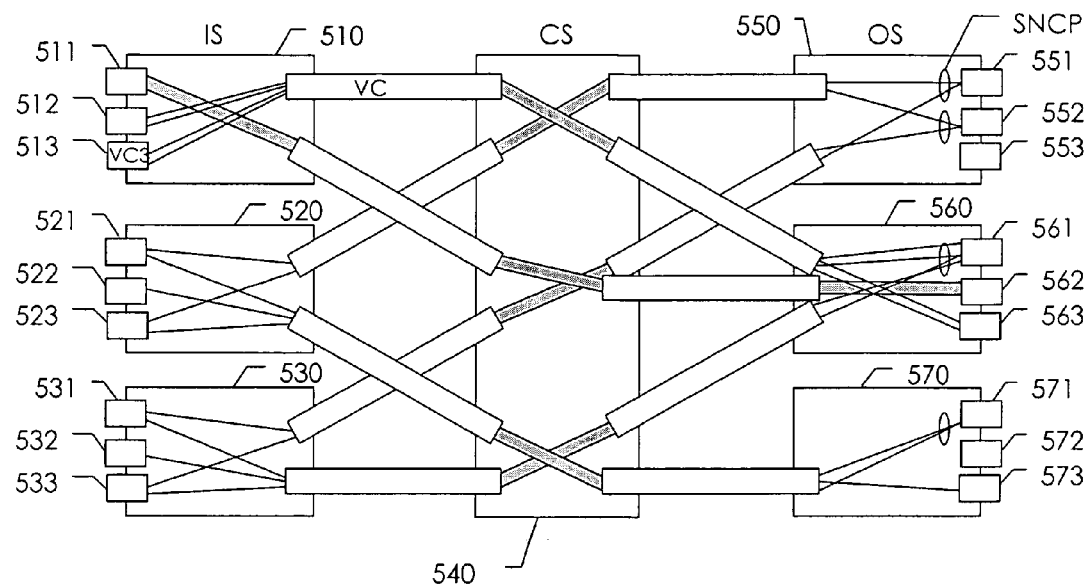
FIG. 5 shows schematically the working principle in the lower order matrix.

The working principle of the matrix arrangement according to the invention is shown schematically in FIG. 5. Three input stage modules 510, 520, 530, three output stage modules 550, 560, 570 and the center stage matrix board 540 are shown. By way of example, three VC3 are shown per input and per output stage module, e.g., 511, 512, and 513 for module 510. It should be clear, however, that in reality, each module has a capacity of 128 (i.e., 2×64) STM-1 equivalents and hence processes 384 VC3s.

Lower order switching, depicted as thin lines through the end stages IS and OS, takes only place in the input and output stage modules. Conversely, the center stage CS switches only higher order virtual containers, i.e., VC-3 in the preferred embodiment. This is represented by gray-shaded "pipes" crossing the center stage CS. A VC-12 that is contained in the VC-3 522 at input stage module 520 and that is destined for the output VC-3 573 at output stage 570 is switched by module 520 in space and time to a VC-3 center stage matrix connection towards module 570. In other words, VC-3 connections are set-up through the center stage matrix to interconnect the various input stage modules to the various output stage modules as required. In the input stage, a lower order VC destined for a particular output stage module is packed into an internally used VC-3 leading through the center stage to the appropriate output stage module and at the output stage module, the lower order VC is extracted from the internal VC-3 and sorted to the appropriate output destination, i.e., to VC-3 573 in this example.

It is preferable in this context that lower order VCs are packed in an optimized way into the VC-3 center stage connections. If a connection for a lower order tributary is set up, an already existing but partially filled VC-3 connection between the concerned first and third stage matrix modules has to be re-used. Only if this is not possible, because all VC-3 leading to the concerned output stage module are fully filled, a new VC-3 connection is set up through the center stage.

It is also possible to set up connections for entire VC-3s rather than for smaller tributaries. This is shown for VC-3 511. In addition, sub-network connection protection (SNCP) is performed in the output stage modules. This is shown for VC-3s 551, 552, 561, and 571. SNCP means that a tributary is transmitted via two independent paths, i.e., the active and the protection path, and that the better of the two signal copies is selected at the termination point of the SNCP. To fully support SNCP, an expansion of the matrix capacity from 128 STM-1 equivalents at the inputs stages to 256 STM-1 equivalents towards the center stage is foreseen.

In the specific embodiment, the input and output matrix stages are capable of switching VC-3 and VC-12, which are the most commonly used multiplex unit types in ETSI SDH systems. Alternatively, a system designed for the US SONET market would be capable of switching VC-11 rather than VC-12 in addition to VC-3. It would also be possible to handle VC-11, VC-12, and VC-2 within a single system, but with the restriction that these are grouped to VT-groups, where each VT-group can contain either one single VC-2, or three VC-12s, or four VC-11s but that inside any such VT-group no mixing of different VC types (VC-11, VC-12) is allowed.

The partially used VC-3 connections cannot be completely avoided. To cope with this in all situations, the capacity of the end stage modules is preferably reduced from 128 to 125 STM-1 equivalents for the sixteen end stage modules. The expansion in the input stage is then 125:256.

Due to deletion of connections of lower order tributaries it is possible that after a certain time a large number of partially used internal VC-3 connections may remain. This situation can be improved by performing an optimization of the internal connections, i.e. a re-packing of connections in the input and output stages. In order to reduce the connection set-up time, the optimization should be done when the ratio between used and necessary higher order connections gets to high for instance after a configurable number of crossconnections of lower order virtual tributaries have been released.

The principle of the re-packing algorithm is as follows: For each pair of first and third stages, low order connections are moved from some high order connections, preferably those that are least occupied, to other high order connections, preferably those that are most occupied, until at most one high order connection remains partially occupied. The old and new low order connections can co-exist for some time (bridge and roll), which can provide hitless re-packing even when the three stages are not switched synchronously.

Figure 6:
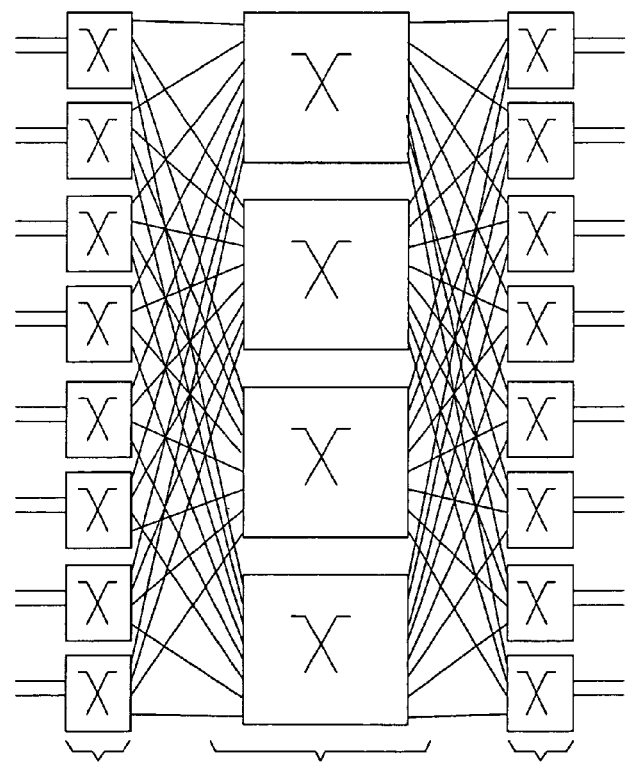
FIG. 6 shows a network element with a three stage lower order switch matrix.

FIG. 6 shows in a second embodiment a network element with a three stage lower order switch matrix, preferably a Clos matrix. The matrix has an input matrix stage IS and an output matrix stage OS. Both include a plurality of hybrid matrices designed to switch said lower order multiplex units or higher order multiplex units as described with respect to the first embodiment. The center stage on the other hand contains a plurality of matrices, which are capable of switching only higher order multiplex units. Each of the plurality of center stage matrices is connected to each of the first input matrix stage matrices and each of the output matrix stage matrices.

In this aspect of the invention, the center stage is allowed to be made of several smaller modules, instead of being a single large broadband switch. It is advantageous to use in a Clos configuration several small broadband center stage modules rather than a single large center stage matrix. This improves scalability, reduces costs for the manufacturer, and increases flexibility for the customer.

Since the broadband center stage is realized as several modules, this requires rearranging the paths through the center stage CS. Classical rearrangement algorithms can be adapted to the new configuration.

It may be necessary to occasionally optimize the system to free inefficiently used broadband paths by "repacking" the VC connections (virtual container, also known as VT—virtual tributary connections in the SONET terminology) inside the broadband paths, thus freeing a broadband timeslot on a link between the center stage CS and the input stage IS or output stage OS.

The input stage IS and the output stage OS modules are hybrid broadband/wideband switches. Their inputs and outputs are still broadband links, carrying wideband or broadband connections. As compared to FIG. 2, there are now several center stage matrix modules, and each of the input stage IS and output stage OS modules is connected to each of the center stage modules in a symmetric pattern.

Depending on the numbers of center stages and on the capacity of the various broadband links, the system can be blocking, rearrangeably non-blocking or strictly non-blocking. The preferred configuration is usually to be rearrangeably non-blocking.

Broadband paths are setup between the input stage IS modules and output stage OS modules depending on the broadband and wideband traffic pattern. When a new broadband path is requested (either because of a new broadband or a new wideband connection), it may be first necessary to "repack" existing wideband connections to free a broadband link. It is advantageous to free broadband links such that a center stage will have free links to the input stage IS and to the output stage OS used by the new connection. If this is not possible, the center stage broadband paths must be rearranged. This is not completely classical because the input stage IS and output stage OS are wideband switches, i.e., capable of switching higher and lower order virtual containers. It turns out that classical rearrangement algorithms can be adopted to find the paths through the center stage. When rearranging a broadband path carrying wideband connections, it is necessary to reroute all such connections from the old broadband link to the new broadband link in the affected IS and OS modules, see FIG. 7. This can be done in a synchronous "hitless" manner or by using a "bridge and roll" type algorithm.

FIG. 7a shows a traditional broadband rearrangement. One (or several) broadband connections in an end stage IS or OS are disconnected (long dash) from a "pipe" leading to the old (P2a) center stage module and reconnected (short dash) to a "pipe" leading to the new (P1a) center stage module.

FIG. 7b shows a rearrangement in the proposed system. An end stage switches broadband (double lines) or wideband (single lines). In a broadband rearrangement, all wideband connections, possibly originating from different broadband input "pipes", are disconnected (long dash) from broadband "pipe" leading to the old (P2b) center stage module and reconnected (short dash) to a "pipe" leading to the new (P1b) center stage module.

It should be noted that the constructional details and characteristics described with respect to the first embodiment above can be similarly applied also to the second embodiment. Moreover, it should be noted that the end stages described above can support both broadband and wideband connections.

Having described two preferred embodiments of the invention in full detail, it should be clear to those skilled in the art, that various modifications and changes can be done without departing from the spirit and concepts of the invention.

What is claimed is:

1. A network element for a transport network designed for the transport of framed multiplex signals comprising higher order multiplex units capable of carrying lower order multiplex units, the network element comprising:
    a multistage lower order switch matrix wherein said lower order switch matrix comprises:
        at least an input matrix stage and an output matrix stage which are both designed to switch said lower order multiplex units, and
        a center stage capable of only switching higher order multiplex units; and
    input/output ports which receive and transmit the framed multiplex signals comprising frames carrying the higher order multiplexing units, wherein each higher order multiplexing unit is capable of carrying lower order multiplexing units.

2. A network element according to claim 1, wherein said lower order multiplex units are addressed inside said higher order multiplex units by tributary unit pointers and wherein said network element comprises tributary unit pointer processors for adapting said tributary unit pointers.

3. A network element according to claim 1, wherein said multiplex signals conform to ITU-T recommendations for SDH, wherein said higher order multiplex units comprise virtual containers of a type VC-4 or VC-3 and said lower order multiplex units comprise lower order virtual containers of a type VC-3, VC-2, VC-12, or VC-11, and wherein said center stage is capable of switching at least virtual containers of the type VC-3 and said input matrix stage and said output matrix stage are capable of switching at least two of said lower order virtual container types.

4. A network element according to claim 1, wherein said center stage is a square matrix.

5. A network element according to claim 1, further comprising a higher order switching matrix connected in series with said lower order switching matrix.

6. A network element according to claim 1, wherein said input matrix stage and said output matrix stage comprise a number of switch modules, and wherein an input stage module and an associated output stage module are physically arranged on an I/O board of said network element.

7. A network element according to claim 6, wherein said center stage is physically arranged on at least one matrix board and wherein said I/O board and said matrix board are interconnected through a back panel of said network element.

8. A network element according to claim 6, wherein said input stage module and said associated output stage module physically arranged on the same I/O board have a direct interconnection for low order connections that remain on the same I/O board.

9. A network element according to claim 1, wherein said input matrix stage has an expansion of at least 1:2 from its inputs to its outputs.

10. A network element according to claim 1, which is adapted to perform an optimization of higher order internal connections set up in said center stage by repacking lower order connections set up in said input matrix stage and in said output matrix stage so as to minimize the number of partially filled internal higher order multiplexing units.

11. A network element for a transport network designed for the transport of framed multiplex signals comprising higher order multiplex units capable of carrying lower order multiplex units, wherein the network element comprises a three stage lower order switch matrix comprising:
- an input matrix stage and an output matrix stage, wherein the input matrix stage comprises a plurality of hybrid matrices and the output matrix stage comprises a plurality of hybrid matrices, wherein the plurality of hybrid matrices of the input matrix stage and the output matrix stage are designed to switch said lower order multiplex units or higher order multiplex units;
- a center stage comprising of a plurality of matrices capable of switching higher order multiplex units only, wherein each of the plurality of center stage matrices is connected to each of the input matrix stage matrices and each of the output matrix stage matrices; and
- input/output ports which receive and transmit the framed multiplex signals comprising frames carrying the higher order multiplexing units, wherein each higher order multiplexing unit is capable of carrying lower order multiplexing units.

12. A network element according to claim 11, wherein said lower order multiplex units are addressed inside said higher order multiplex units by tributary unit pointers and wherein said network element comprises tributary unit pointer processors for adapting said tributary unit pointers.

13. A network element according to claim 11, wherein said multiplex signals conform to ITU-T recommendations for SDH, wherein said higher order multiplex units comprise virtual containers of a type VC-4 or VC-3 and said lower order multiplex units comprise lower order virtual containers of a type VC-3, VC-2, VC-12, or VC-11, and wherein said center stage is capable of switching at least virtual containers of the type VC-3 and said input matrix stage and said output matrix stage are capable of switching at least two of said lower order virtual container types.

14. A network element according to claim 11, wherein said three stage lower order switch matrix is a Clos matrix.

15. A network element according to claim 11, further comprising a higher order switching matrix connected in series with said lower order switching matrix.

16. A network element according to claim 11, wherein said input stage and said output stage comprise a number of switch modules, and wherein an input matrix stage module and an associated output matrix stage module are physically arranged on an I/O board of said network element.

17. A network element according to claim 16, wherein said plurality of center stage matrices are physically arranged on one or more matrix boards and wherein said I/O board and said one or more matrix boards are interconnected through a back panel of said network element.

18. A network element according to claim 16, wherein said input stage module and said associated output stage module physically arranged on the same I/O board have a direct interconnection for low order connections that remain on the same I/O board.

19. A network element according to claim 11, wherein said input matrix stage has an expansion of at least 1:2 from its inputs to its outputs.

20. A network element according to claim 11, which is adapted to perform an optimization of higher order internal connections set up in said center stage by repacking lower order connections set up in said input matrix stage and in said output matrix stage so as to minimize the number of partially filled internal higher order multiplexing units.

* * * * *